(12) United States Patent
Tian et al.

(10) Patent No.: US 10,444,601 B2
(45) Date of Patent: Oct. 15, 2019

(54) PAN-TILT AND AN AERIAL CAMERA WHICH CONTAINS THE PAN-TILT

(71) Applicant: Yuneec International (China) Co, Ltd, Kunshan, Jiangsu Province (CN)

(72) Inventors: Yu Tian, Kunshan (CN); Wenyan Jiang, Kunshan (CN)

(73) Assignee: YUNEEC INTERNATIONAL (CHINA) CO, LTD, Kunshan, Jiangsu Province (CN)

( * ) Notice: Subject to any disclaimer, the term of this patent is extended or adjusted under 35 U.S.C. 154(b) by 169 days.

(21) Appl. No.: 15/493,950

(22) Filed: Apr. 21, 2017

(65) Prior Publication Data

US 2017/0307961 A1  Oct. 26, 2017

(30) Foreign Application Priority Data

Apr. 22, 2016  (CN) .................... 2016 2 0348053 U

(51) Int. Cl.
| | |
|---|---|
| G03B 15/00 | (2006.01) |
| B64C 39/02 | (2006.01) |
| B64D 47/08 | (2006.01) |
| F16C 11/06 | (2006.01) |
| F16F 15/02 | (2006.01) |
| F16M 13/02 | (2006.01) |

(Continued)

(52) U.S. Cl.
CPC .......... *G03B 15/006* (2013.01); *B64C 39/024* (2013.01); *B64D 47/08* (2013.01); *F16C 11/04* (2013.01); *F16C 11/045* (2013.01); *F16C 11/06* (2013.01); *F16C 27/06* (2013.01); *F16C 31/02* (2013.01); *F16F 15/02* (2013.01); *F16M 11/10* (2013.01); *F16M 11/18* (2013.01); *F16M 11/2014* (2013.01); *F16M 13/02* (2013.01); *G03B 17/561* (2013.01); *G05D 1/0094* (2013.01); *B64C 2201/024* (2013.01); *B64C 2201/108* (2013.01); *B64C 2201/127* (2013.01); *F16C 2326/43* (2013.01); *F16F 2230/0005* (2013.01); *F16F 2234/06* (2013.01)

(58) Field of Classification Search
CPC .......................... G03B 15/006; B64C 39/024
See application file for complete search history.

(56) References Cited

U.S. PATENT DOCUMENTS

| | | | | |
|---|---|---|---|---|
| 5,184,521 A | * | 2/1993 | Tyler ...................... | G01C 21/18 248/324 |
| 8,167,506 B2 | * | 5/2012 | Martos .................. | G03B 15/00 396/427 |

(Continued)

*Primary Examiner* — Clayton E. LaBalle
*Assistant Examiner* — Dennis Hancock
(74) *Attorney, Agent, or Firm* — Muncy, Geissler, Olds & Lowe, P.C.

(57) ABSTRACT

A pan-tilt and an aerial camera containing a pan-tilt. This pan-tilt includes a motor which has a first part and a second part of relative movement, a slip ring which is installed in the motor and has a fixing part and a rotating part, and a control part which is installed under the motor and at which the second part is installed. The center of the motor has a first hole which longitudinally penetrates through, in which the slip ring is installed. The fixing part is static relative to the first part. The control part is electrically connected to the rotating part via a wire which is set to pass through the first hole. The control part is electrically connected with the motor. The pan-tilt can be rotated by 360 degrees.

16 Claims, 4 Drawing Sheets

(51) Int. Cl.
*G03B 17/56* (2006.01)
*G05D 1/00* (2006.01)
*F16C 11/04* (2006.01)
*F16C 27/06* (2006.01)
*F16C 31/02* (2006.01)
*F16M 11/10* (2006.01)
*F16M 11/18* (2006.01)
*F16M 11/20* (2006.01)

(56) References Cited

U.S. PATENT DOCUMENTS

| | | | | |
|---|---|---|---|---|
| 8,317,414 | B2* | 11/2012 | Jones | G03B 17/02 |
| | | | | 396/427 |
| 9,212,715 | B2* | 12/2015 | Starns | F16F 3/0876 |
| 2015/0130390 | A1* | 5/2015 | Pietromonaco | H02K 16/02 |
| | | | | 318/716 |
| 2015/0233287 | A1* | 8/2015 | Dippold | F02B 67/08 |
| | | | | 310/100 |
| 2016/0118855 | A1* | 4/2016 | Maruyama | H02K 5/10 |
| | | | | 310/68 B |

* cited by examiner

PAN-TILT AND AN AERIAL CAMERA WHICH CONTAINS THE PAN-TILT

BACKGROUND OF THE INVENTION

Field of the Invention

This invention relates to a Pan-tilt and an aerial camera which contains the Pan-tilt.

Brief Discussion of the Related Art

At present, aerial cameras have been widely applied. In aerial shooting, it is necessary to rotate the camera. The existing aerial cameras cannot rotate by 360 degrees without limit due to their wiring problem in their pan-tilt so that the operation of aerial camera is not convenient.

SUMMARY OF THE INVENTION

To overcome technical defects of the prior art, this invention is intended to provide a pan-tilt which is used to rotationally take photos by 360 degrees without limit, and an aerial camera containing a pan-tilt.

This invention uses the following technical scheme to solve the above-mentioned technical problem:

a pan-tilt, comprising:

a motor, which comprises a first part and a second part of relative movement;

a slip ring, which is installed in the motor, comprising a fixing part and a rotating part;

a control part, which is installed under the motor and at which the second part is fixedly installed;

wherein, the center of the motor is provided with a first hole which longitudinally penetrates through (in which the slip ring is installed), the fixing part is static relative to the first part, the control part is electrically connected to the rotating part via a wire (which is installed in the first hole), and the control part is electrically connected with the motor.

Preferably, the first hole is provided with a seat, which radially protrudes inward relative to the inner wall of the first hole and the center of which is provided with a second hole, and the fixing part is seated at the seat and the rotating part is set to pass through the second hole.

Preferably, the pan-tilt also includes a connection platform, which is located above the motor and at which the first part is fixedly installed.

Preferably, the connection platform comprises an upper vibration damping plate, a lower vibration damping plate and a connector, which is connected between the upper vibration damping plate and the lower vibration damping plate;

The first part is fixedly installed at the lower vibration damping plate, the center of which is provided with a third hole; the fixing part is set to pass through the third hole, and a slip ring fixing part is installed above the fixing part and fixedly located at the lower vibration damping plate.

Preferably, the connection platform also includes a conductive contact plate, which is installed between the upper vibration damping plate and the lower vibration damping plate, and the contact of the contact plate set to pass through the upper vibration damping plate, and the contact plate is electrically connected to the fixing part.

Preferably, the connection platform also includes a power supply covering plate, which covers the lower surface of the contact plate.

Preferably, the connector is a threaded vibration damping ball.

Preferably, the pan-tilt also includes a cantilever, the first end of which is fixedly installed at the second part and located under the second part, and the control part is fixedly installed at the first end of the cantilever.

Preferably, the control part comprises a master control circuit board, a master control fixing plate and a master control covering plate, wherein the master control circuit board is fixedly installed at the master control fixing plate, which is fixedly installed at the first end of the cantilever, and the master control covering plate covers the master control fixing plate and the master control circuit board and is fixedly installed at the cantilever.

Preferably, the control part also includes a sensor, which is installed at the master control fixing plate and used to detect the rotation angle of the motor.

Preferably, the first part is a rotor and the second part is a stator.

Preferably, the first part is a stator and the second part is a rotor.

An aerial camera, comprising:

a pan-tilt as stated above;

an aerial vehicle, which is fixedly installed at the first part and electrically connected with the fixing part;

a camera, which is fixedly installed at the second part.

Preferably, the aerial camera also includes a connection platform, which is installed above the motor, at which the first part is fixedly installed and to which the aerial vehicle is connected.

Preferably, the connection platform comprises an upper vibration damping plate, a lower vibration damping plate and a connector, which is connected between the upper vibration damping plate and the lower vibration damping plate;

The aerial vehicle is connected to the upper vibration damping plate;

The first part is fixedly installed at the lower vibration damping plate and located under the lower vibration damping plate.

Preferably, the connection platform also includes a conductive contact plate, which is installed between the upper vibration damping plate and the lower vibration damping plate, and the contact of the contact plate passes through the upper vibration damping plate to contact with the aerial vehicle, and the contact plate is electrically connected to the fixing part.

Preferably, the Pan-tilt also includes a cantilever, the first end of which is fixedly installed at the second part, and the control part is fixedly installed at the first end of the cantilever and the camera is fixedly installed at the second end of the cantilever.

Preferably, the aerial vehicle is detachably connected to the connection platform.

The positive effect of this invention lies in that: in the above-mentioned pan-tilt, the electric wire connected with the control part is connected to the rotating part through the first hole at the center of the connection platform so that the electric wire does not twist at the control part with the rotation of the motor to result in that the wire is damaged or the motor cannot rotate normally; therefore the motor can rotate by 360 degrees without limit. The aerial camera uses the pan-tilt so that a camera can rotationally take photos by 360 degrees without limit.

DESCRIPTION OF SIGNS IN THE FIGURES 10 pan-tilt
20 Connection Platform
21 Upper Vibration Damping Plate
22 Lower Vibration Damping Plate
221 The Third Hole
23 Connector
24 Contact Plate
241 Contact
25 Power Supply Covering Plate
26 Slip Ring Fixing Part
30 Slip Ring
31 Fixing Part
32 Rotating Part
40 Motor
41 Rotor
42 Stator
43 First Hole
44 Seat
45 Second Hole
50 Cantilever
60 Control Part
61 Master Control Circuit Board
62 Master Control Fixing Plate
63 Master Control Covering Plate
64 Sensor
70 Aerial Vehicle
80 Camera
100 Aerial Camera

DETAILED DISCUSSION OF THE PREFERRED EMBODIMENTS

According to the figures, below is the further explanation of this invention. The invention can be embodied in many forms, but shall not be limited to the embodiment herein.

As shown in FIGS. 1~4, the coordinate axis is set up for clarity, but it should be understood that the coordinate axis is not used to limit the scope of this invention but to describe this embodiment.

Figure 1:
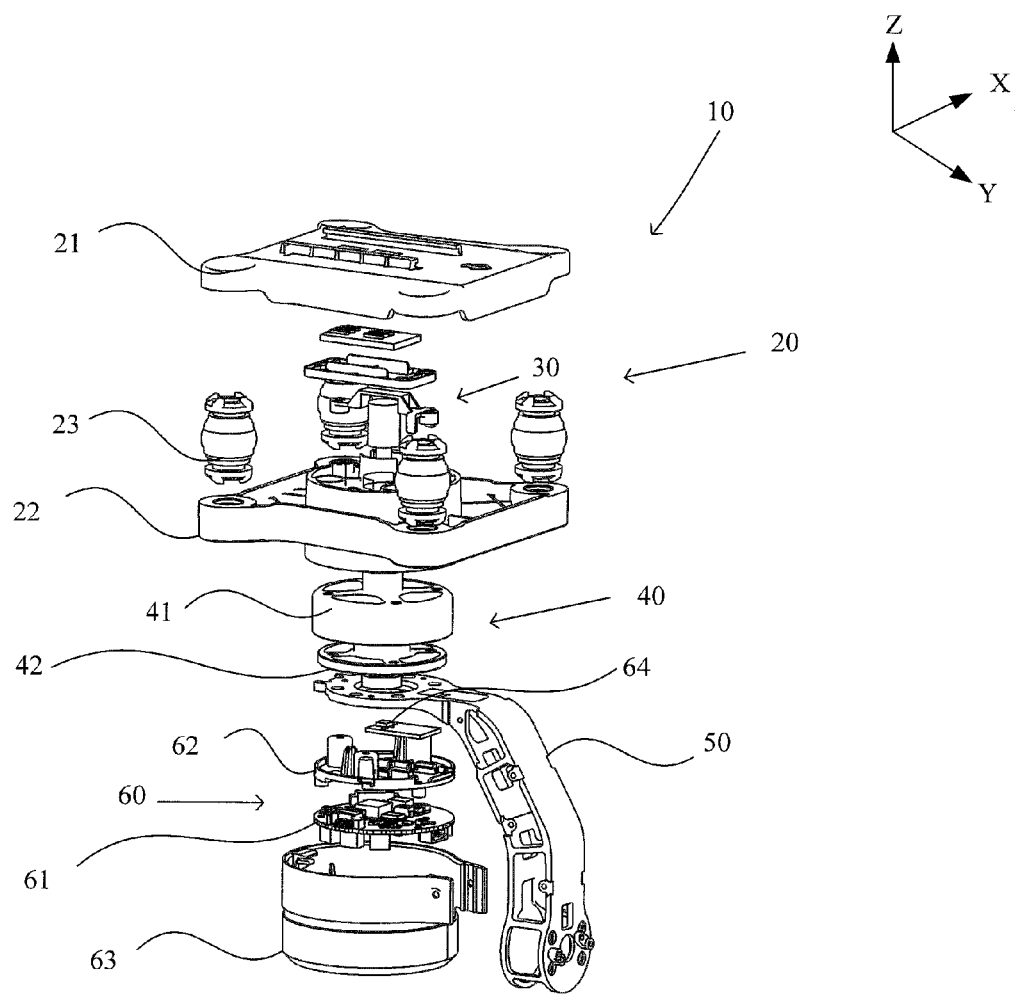
FIG. 1 is a schematic diagram for three-dimensional decomposition of pan-tilt in a preferred embodiment of this invention.
Figure 2:
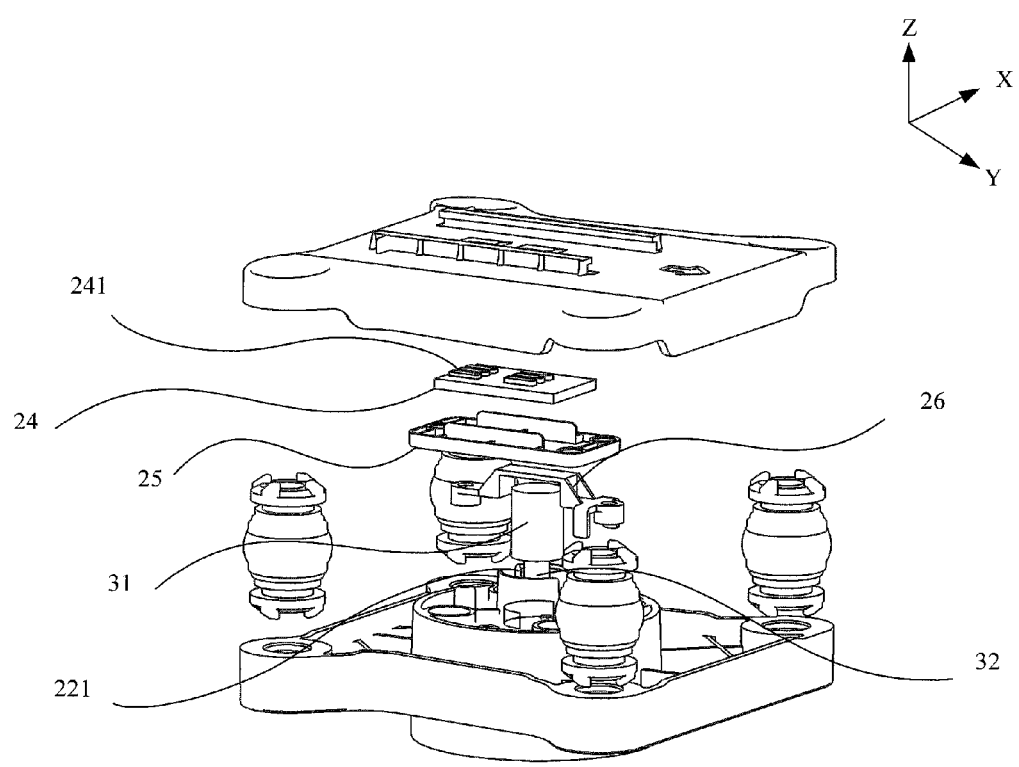
FIG. 2 is a schematic diagram for connection platform as shown in FIG. 1.

As shown in FIGS. 1 and 2, a pan-tilt 10 comprises a connection platform 20, a slip ring 30, a motor 40, a cantilever 50 and a control part 60.

The connection platform 20 comprises an upper vibration damping plate 21, a lower vibration damping plate 22, a connector 23, a contact plate 24 and a power supply covering plate 25.

The connector 23 is connected between the upper vibration damping plate 21 and the lower vibration damping plate 22. The connector 23 is preferably selected to be a threaded vibration damping ball.

The contact plate 24 and the power supply covering plate 25 are installed between the upper vibration damping plate 21 and the lower vibration damping plate 22. The contact plate 24 is electrically conductive. The contact 241 of the contact plate 24 is set to pass through the upper vibration damping plate 21. The number of the contacts 241 can be one or more. The upper vibration damping plate 21 is provided with some holes corresponding to the contacts 241. The power supply covering plate 25 covers the lower surface of the contact plate 24.

The slip ring 30 comprises a fixing part 31 and a rotating part 32. The rotating part 32 can rotate on the X-axial and Y-axial planes relative to the fixing part 31. The fixing part 31 is electrically connected with the contact plate 24 via an electric wire. The rotating part 32 is electrically connected with the control part 60.

The center of the lower vibration damping plate 22 is provided with a third hole 221, through which a part of the fixing part 31 passes.

Figure 3:
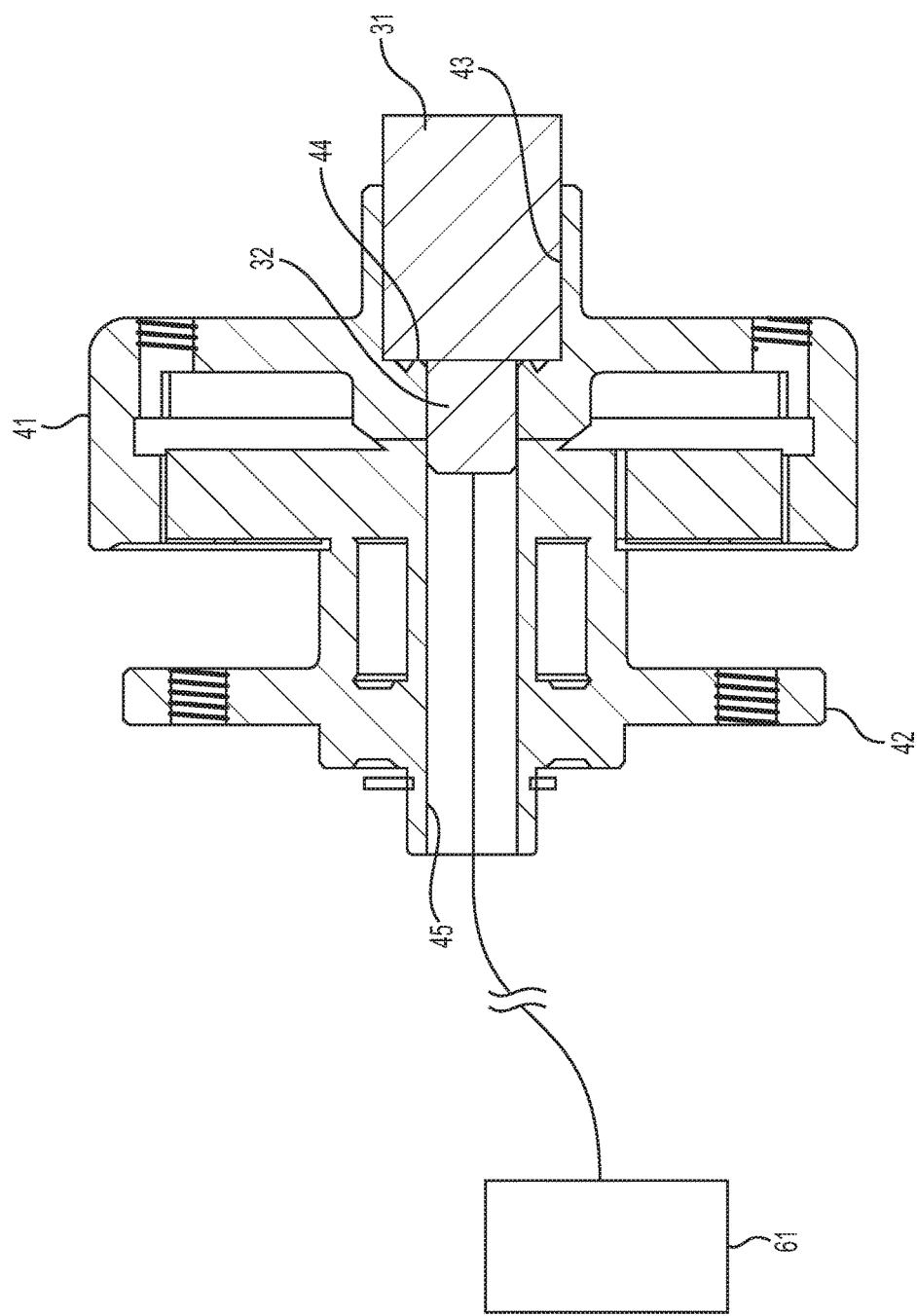
FIG. 3 is a schematic diagram for section of motor as shown in FIG. 1, where a slip ring is installed in such motor.

As shown in FIG. 3, a motor 40 is installed under the connection platform 20. A motor 40 comprises a first part and a second part of relative movement. In this embodiment, the first part is a rotor 41 and the second part is a stator 42. Certainly, the first part can be a stator and the second part can be a rotor. The rotor 41 and the stator 42 can relatively rotate on the X-axial and Y-axial planes. The rotor 41 is fixedly installed at the lower vibration damping plate 22. The first end of the cantilever 50 is fixedly installed at the rotor 42.

The center of the motor 40 is provided with a first hole 43 which longitudinally penetrates through (in the direction of Z axis). The first hole 43 is provided with a seat 44, which radially protrudes inward relative to the inner wall of the first hole 43 and the center of which is provided with a second hole 45, and the fixing part of the slip ring 30 is seated at the seat 44 and the rotating part 32 is set to pass through the second hole 45. A part of the fixing part 31 emerges from the first hole 43 and is set to pass through the third hole 221, and a slip ring fixing part 26 is installed upon the fixing part 31 and fixedly set at the lower vibration damping plate 22. With the help of the pressing force of the slip ring fixing part 26, the fixing part 31 is fixed in a groove formed by the seat 44 and the inner wall of the first hole 43 and static relative to the rotor 41. Of course, the fixing part can also be fixed in the groove through other means such as adhesive bonding.

A control part 60 comprises a master control circuit board 61, a master control fixing plate 62, a master control covering plate 63 and a sensor 64. The master control circuit board 61 is fixedly installed at the master control fixing plate 62, which is fixedly installed at the first end of the cantilever 50, and the master control covering plate 63 covers the master control fixing plate 62 and the master control circuit board 61 and is fixedly installed at the cantilever 50. The sensor 64 is installed at the master control fixing plate 62 and used to detect the rotation angle of the motor 40. The sensor 64 transmits the detected data to the master control circuit board 61 so that the master control circuit board 61 controls the rotation of the motor 40. The master control circuit board 61 is electrically connected with the rotating part 32 of the slip ring 30 via an electric wire, which is set to pass through the second hole 45 of the motor 40. Meanwhile, the master control circuit board 61 is electrically connected with the motor 40 to control the rotation of the motor 40. The rotation of the motor 40 mentioned herein refers to relative rotation between the rotor 41 and the stator 42. In this embodiment, the master control fixing plate 62 and the first end of the cantilever are provided with a hole respectively, and these holes communicate with the first hole 43 and the second hole 45 at the center of the motor 40 to make the electric wire pass through.

On the pan-tilt 10, the upper vibration damping plate 21 of the connection platform 20 is connected with an external power supply, wherein the electricity is fed to the slip ring 30 via the contact plate 24, and the slip ring 30 transmits electricity to the master control circuit board 61, which controls the rotation of the motor 40. When the motor 40 rotates, it drives the master control circuit board 61 to rotate so that the electric wire located in the second hole 45 at the motor 40 begins to twist, but since the electric wire is installed at the rotating part 32 of the slip ring 30 and the rotating part 32 rotates with the twisting of the electric wire, the power supply from the electric wire and the rotation of the motor 40 are not hindered.

Figure 4:
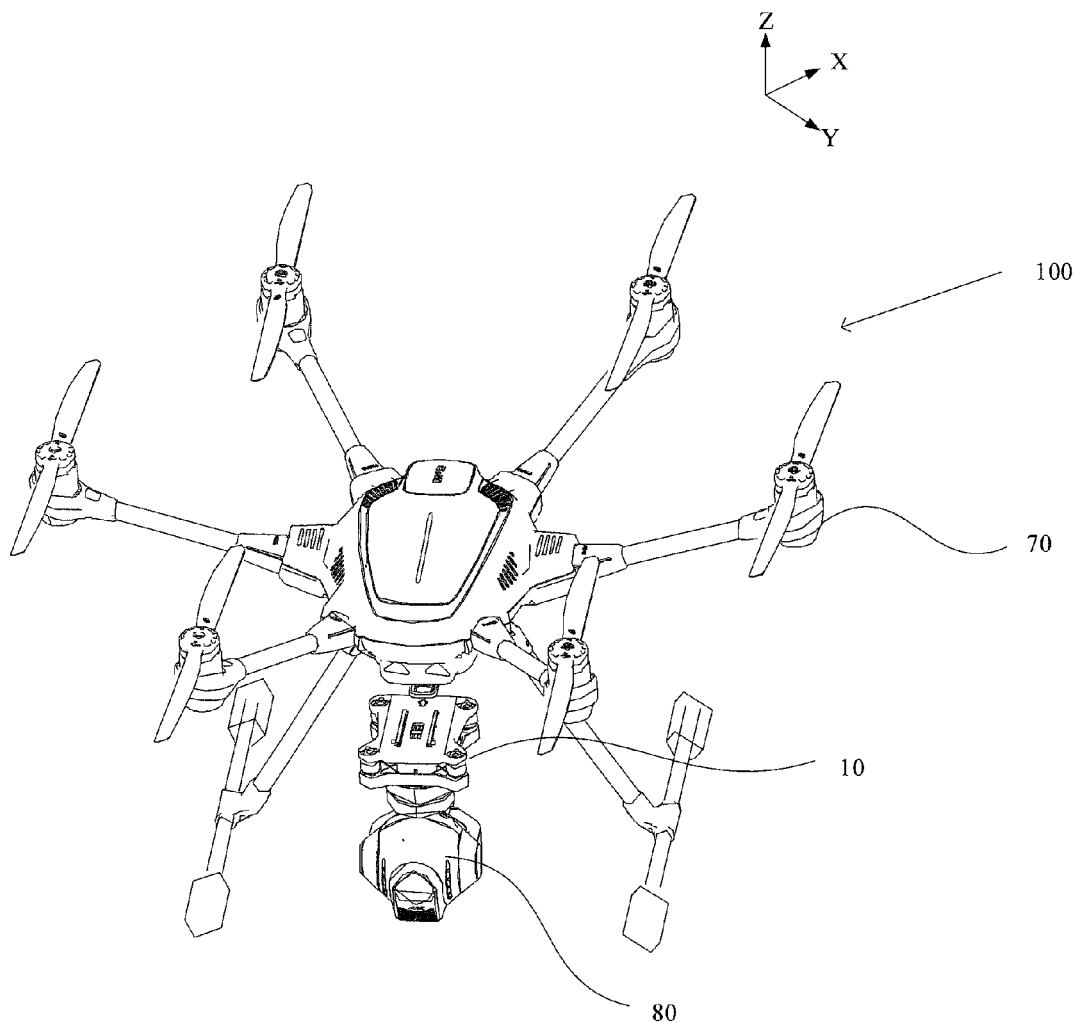
FIG. 4 is a schematic diagram for three-dimensional decomposition of aerial camera in a preferred embodiment of this invention.

As shown in FIG. 4, an aerial camera 100 comprises the pan-tilt 10 as stated above, an aerial vehicle 70 and a camera 80.

The aerial vehicle 70 is installed above the connection platform 20 and detachably connected to the upper vibration damping plate 21. The contact 241 of the contact plate 24 passes through the hole of the upper vibration damping plate 21 to contact with the lower surface of the aerial vehicle 70. The lower surface of the aerial vehicle 70 is provided with a component electrically connected with the contact 241, and the component is electrically connected with the power supply of the aerial vehicle 70.

The camera 80 is fixedly installed at the second end of the cantilever 50.

In an aerial camera 100, the power supply of the aerial vehicle 70 supplies electricity to the master control circuit board 61, and the master control circuit board 61 controls the rotation of the motor 40 so that the cantilever 50 rotates to drive the camera 80 to rotate on the X-axial and Y-axial planes.

Although specific embodiments of this invention have been described above, it should be understood by those skilled in the art that this embodiment is used for illustration only and the scope of protection of this invention is limited by the claims herein. Without prejudice to the principle and essence of this invention, those skilled in the art could change or modify these embodiments, but these changes or modifications should be within the scope of protection of this invention.

The invention claimed is:

1. A pan-tilt, comprising:
   a motor, which comprises a first part and a second part of relative coaxial rotation, wherein the first part is one of a rotor and a stator and the second part is another of the rotor and the stator;
   a slip ring, comprising a fixing part and a rotating part, wherein the rotating part rotates relatively to the fixing part;
   a control part, which is coupled with the second part of the motor, comprising a master control circuit board and a sensor;
   wherein the center of the motor is provided with a first hole and a second hole which are communicated to each other so as to longitudinally penetrate through the first part and the second part, the fixing part of the slip ring is installed in the first hole and the fixing part is static relative to the first part, the rotating part is installed in the second hole, the master control circuit board of the control part is electrically connected to the rotating part via a wire which is installed in the second hole, and the master control circuit board is electrically connected with the motor;
   wherein the sensor is configured to detect a rotation angle of the motor and to transmit the data of the rotation angle to the master control circuit board so that the master control circuit board controls the relative rotation between the first part and the second part.

2. The pan-tilt of claim 1, wherein the first hole is provided with a seat, which radially protrudes inward relative to the inner wall of the first hole, and the fixing part is seated at the seat.

3. The pan-tilt of claim 2, wherein the pan-tilt also include a connection platform, which is located above the motor and at which the first part is fixedly installed.

4. The pan-tilt of claim 3, wherein the connection platform comprises an upper vibration damping plate, a lower vibration damping plate and a connector, which is connected between the upper vibration damping plate and the lower vibration damping plate;
   the first part is fixedly installed at the lower vibration damping plate, the center of which is provided with a third hole; the fixing part is set to pass through the third hole, and a slip ring fixing part is installed above the fixing part and fixedly located at the lower vibration damping plate.

5. The pan-tilt of claim 4, wherein the connection platform also includes a conductive contact plate, which is installed between the upper vibration damping plate and the lower vibration damping plate, and the contact of the contact plate is set to pass through the upper vibration damping plate and the contact plate is electrically connected to the fixing part.

6. The pan-tilt of claim 5, wherein the connection platform also includes a power supply covering plate, which covers the lower surface of the contact plate.

7. The pan-tilt of claim 4, wherein the connector is a threaded vibration damping ball.

8. The pan-tilt of claim 1, wherein the pan-tilt also includes a cantilever, the first end of which is fixedly installed at the second part and located under the second part, and the control part is fixedly installed at the first end of the cantilever.

9. The pan-tilt of claim 8, wherein the control part further comprises a master control fixing plate and a master control covering plate, wherein the master control circuit board is fixedly installed at the master control fixing plate, which is fixedly installed at the first end of the cantilever, and the master control covering plate covers the master control fixing plate and the master control circuit board and is fixedly installed at the cantilever.

10. The pan-tilt of claim 9, wherein the sensor is installed at the master control fixing plate.

11. An aerial camera, comprising:
    a pan-tilt according to claim 1;
    an aerial vehicle, which is connected to the first part and electrically connected with the fixing part;
    a camera, which is fixedly installed at the second part.

12. The aerial camera of claim 11, wherein the aerial camera also includes a connection platform, which is installed above the motor, at which the first part is fixedly installed and to which the aerial vehicle is connected.

13. The aerial camera of claim 12, wherein the connection platform comprises an upper vibration damping plate, a lower vibration damping plate and a connector, which is connected between the upper vibration damping plate and the lower vibration damping plate;
    the aerial vehicle is connected to the upper vibration damping plate;
    the first part is fixedly installed at the lower vibration damping plate and located under the lower vibration damping plate.

14. The aerial camera of claim 13, wherein the connection platform also includes a conductive contact plate, which is installed between the upper vibration damping plate and the lower vibration damping plate, and the contact of the contact plate passes through the upper vibration damping plate to contact with the aerial vehicle, and the contact plate is electrically connected to the fixing part.

15. The aerial camera of claim 11, wherein the pan-tilt also includes a cantilever, the first end of which is fixedly installed at the second part, and the control part is fixedly installed at the first end of the cantilever and the camera is fixedly installed at the second end of the cantilever.

16. The aerial camera of claim 11, wherein the aerial vehicle is detachably connected to the first part.

* * * * *